United States Patent [19]
Rodriguez

[11] Patent Number: 5,962,817
[45] Date of Patent: Oct. 5, 1999

[54] FISH WEIGHING SCALE ATTACHMENT

[76] Inventor: Antonio Rodriguez, 7302 Tobosa Dr., Temple, Tex. 76503

[21] Appl. No.: 09/226,262

[22] Filed: Jan. 7, 1999

[51] Int. Cl.[6] .......................... G01G 21/00; G01G 21/28; A01K 87/00; A01K 89/00
[52] U.S. Cl. .......................... 177/126; 177/171; 177/238; 177/245; 43/25; 242/223
[58] Field of Search .................................. 73/796; 43/25; 242/223; 177/126, 127, 148, 149, 238, 245, 128, 131, 180, 243, 171

[56] References Cited

U.S. PATENT DOCUMENTS

| | | | |
|---|---|---|---|
| 2,994,622 | 8/1961 | Miller | 177/245 |
| 4,721,174 | 1/1988 | Letzo | 177/245 |
| 5,088,223 | 2/1992 | Chu | 43/25 |
| 5,121,804 | 6/1992 | Labs et al. | 177/132 |
| 5,499,469 | 3/1996 | Guillemette | 43/25 |
| 5,771,624 | 6/1998 | Vickery et al. | 43/25 |

*Primary Examiner*—Randy W. Gibson

[57] ABSTRACT

A fish weighing scale attachment for attachment to a fishing rod for weighing a fish still hooked on the fishing line. The fish weighing scale attachment includes a housing with a channel in a bottom face of the housing. A mounting block is slidably inserted into the channel of the housing. The mounting block has a pair of outwardly extending flexible straps which are coupled to one another. A weighing scale is provided in the housing. The weighing scale has a pivoting weighing arm having a spaced apart pair of upwardly extending fingers. The weighing scale also has a visual display provided on the top face of the housing.

10 Claims, 3 Drawing Sheets

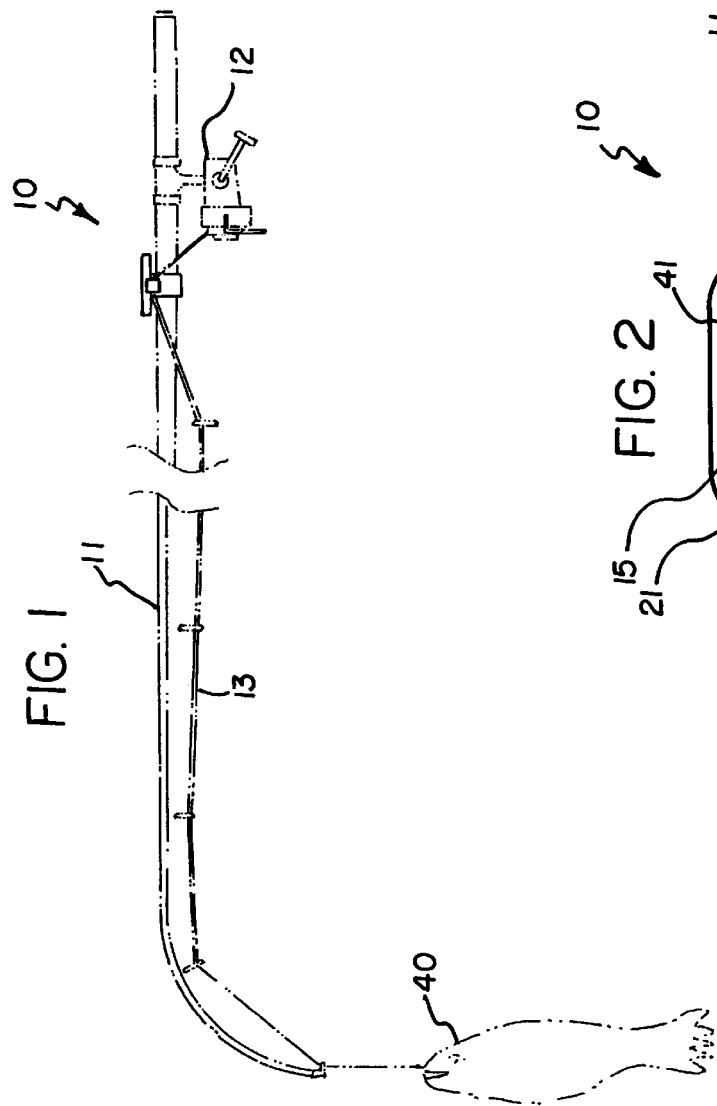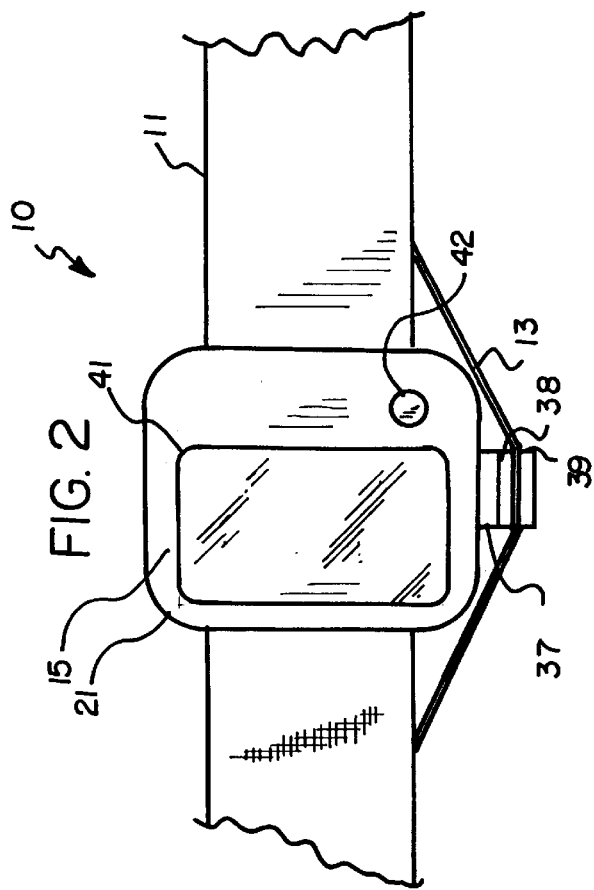

FISH WEIGHING SCALE ATTACHMENT

BACKGROUND OF THE INVENTION

1. Field of the Invention

The present invention relates to fish weighing attachments and more particularly pertains to a new fish weighing scale attachment for attachment to a fishing rod for weighing a fish still hooked on the fishing line.

2. Description of the Prior Art

The use of fish weighing attachments is known in the prior art. More specifically, fish weighing attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,237,370 by Shekter; U.S. Pat. No. 5,062,492 by Inoue; U.S. Pat. No. 5,121,804 by Labs et al.; U.S. Pat. No. 4,995,188 by Ewing; U.S. Pat. No. 4,721,174 by Letzo; and U.S. Pat. No. Des. 351,012 by Burghoff.

While these devices fulfill their respective, particular objectives and requirements, the aforementioned patents do not disclose a new fish weighing scale attachment. The inventive device includes a housing with a channel in a bottom face of the housing. A mounting block is slidably inserted into the channel of the housing. The mounting block has a pair of outwardly extending flexible straps which are coupled to one another. A weighing scale is provided in the housing. The weighing scale has a pivoting weighing arm having a spaced apart pair of upwardly extending fingers. The weighing scale also has a visual display provided on the top face of the housing.

In these respects, the fish weighing scale attachment according to the present invention substantially departs from the conventional concepts and designs of the prior art, and in so doing provides an apparatus primarily developed for the purpose of attachment to a fishing rod for weighing a fish still hooked on the fishing line.

SUMMARY OF THE INVENTION

In view of the foregoing disadvantages inherent in the known types of fish weighing attachments now present in the prior art, the present invention provides a new fish weighing scale attachment construction wherein the same can be utilized for attachment to a fishing rod for weighing a fish still hooked on the fishing line.

The general purpose of the present invention, which will be described subsequently in greater detail, is to provide a new fish weighing scale attachment apparatus and method which has many of the advantages of the fish weighing attachments mentioned heretofore and many novel features that result in a new fish weighing scale attachment which is not anticipated, rendered obvious, suggested, or even implied by any of the prior art fish weighing attachments, either alone or in any combination thereof.

To attain this, the present invention generally comprises a housing with a channel in a bottom face of the housing. A mounting block is slidably inserted into the channel of the housing. The mounting block has a pair of outwardly extending flexible straps which are coupled to one another. A weighing scale is provided in the housing. The weighing scale has a pivoting weighing arm having a spaced apart pair of upwardly extending fingers. The weighing scale also has a visual display provided on the top face of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish weighing scale attachment apparatus and method which has many of the advantages of the fish weighing attachments mentioned heretofore and many novel features that result in a new fish weighing scale attachment which is not anticipated, rendered obvious, suggested, or even implied by any of the prior art fish weighing attachments, either alone or in any combination thereof.

It is another object of the present invention to provide a new fish weighing scale attachment which may be easily and efficiently manufactured and marketed.

It is a further object of the present invention to provide a new fish weighing scale attachment which is of a durable and reliable construction.

An even further object of the present invention is to provide a new fish weighing scale attachment which is susceptible of a low cost of manufacture with regard to both materials and labor, and which accordingly is then susceptible of low prices of sale to the consuming public, thereby making such fish weighing scale attachment economically available to the buying public.

Still yet another object of the present invention is to provide a new fish weighing scale attachment which provides in the apparatuses and methods of the prior art some of the advantages thereof, while simultaneously overcoming some of the disadvantages normally associated therewith.

Still another object of the present invention is to provide a new fish weighing scale attachment for attachment to a fishing rod for weighing a fish still hooked on the fishing line.

Yet another object of the present invention is to provide a new fish weighing scale attachment which includes a housing with a channel in a bottom face of the housing. A mounting block is slidably inserted into the channel of the housing. The mounting block has a pair of outwardly extending flexible straps which are coupled to one another. A weighing scale is provided in the housing. The weighing scale has a pivoting weighing arm having a spaced apart pair of upwardly extending fingers. The weighing scale also has a visual display provided on the top face of the housing.

Still yet another object of the present invention is to provide a new fish weighing scale attachment that lets a user weigh a fish without having to first remove the fish from the hook of the user's fishing line.

Even still another object of the present invention is to provide a new fish weighing scale attachment that has a weighing device with a visual display that may be illuminated by a light source so that a user can see how much a hooked fish weighs in low light conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new fish weighing scale attachment in use according to the present invention with a fish to be weighed with the attachment hooked on to the fishing line.

FIG. 2 is a schematic top view of the present invention on a fishing rod.

DESCRIPTION OF THE PREFERRED EMBODIMENT

Figure 3:
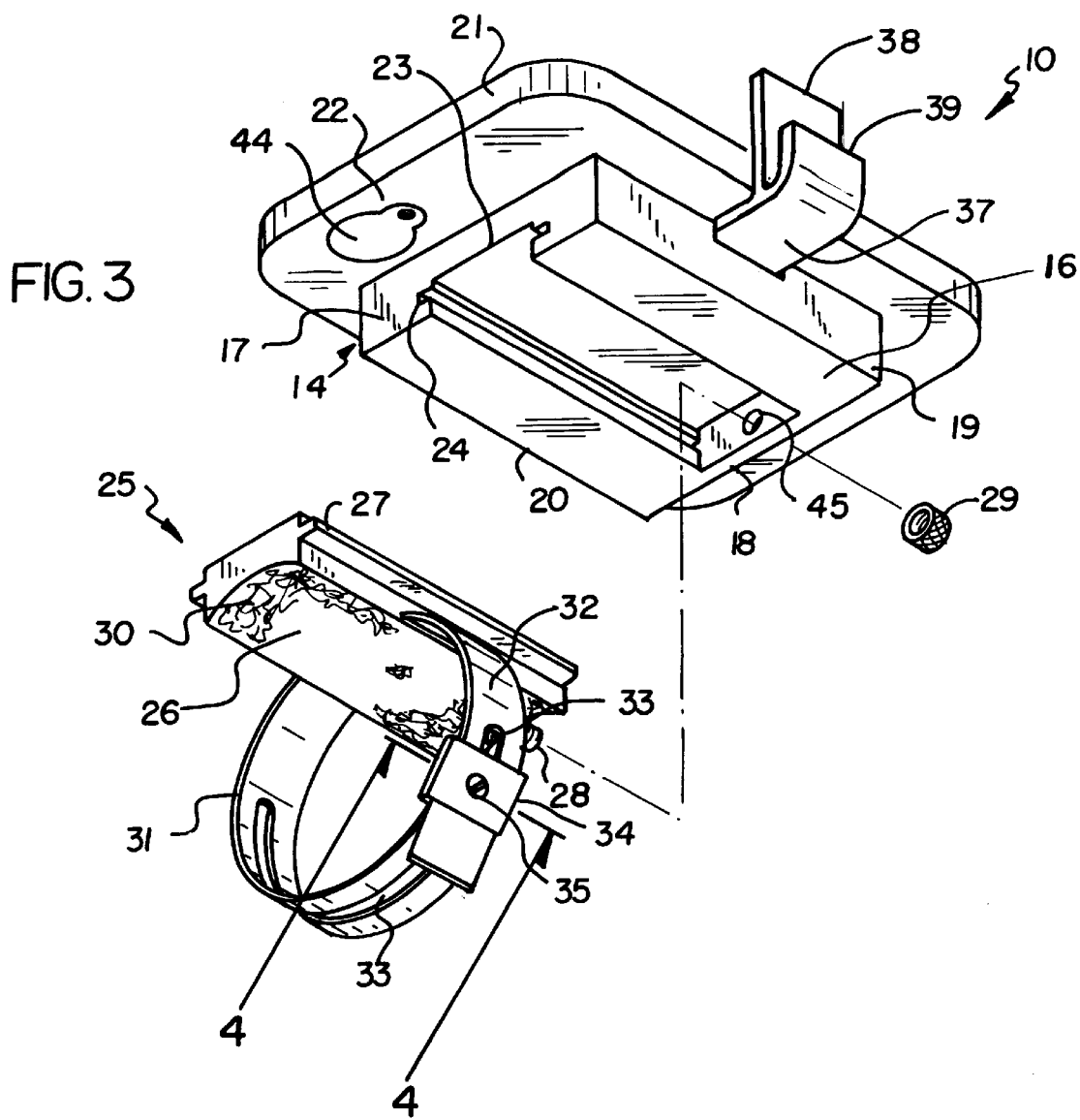
FIG. 3 is a schematic exploded bottom perspective view of the present invention.
Figure 4:
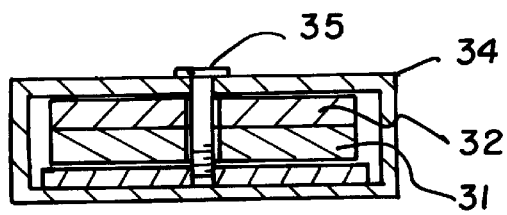
FIG. 4 is a schematic cross sectional view of the coupling buckle of the present invention taken from line 4—4 of FIG. 3.
Figure 5:
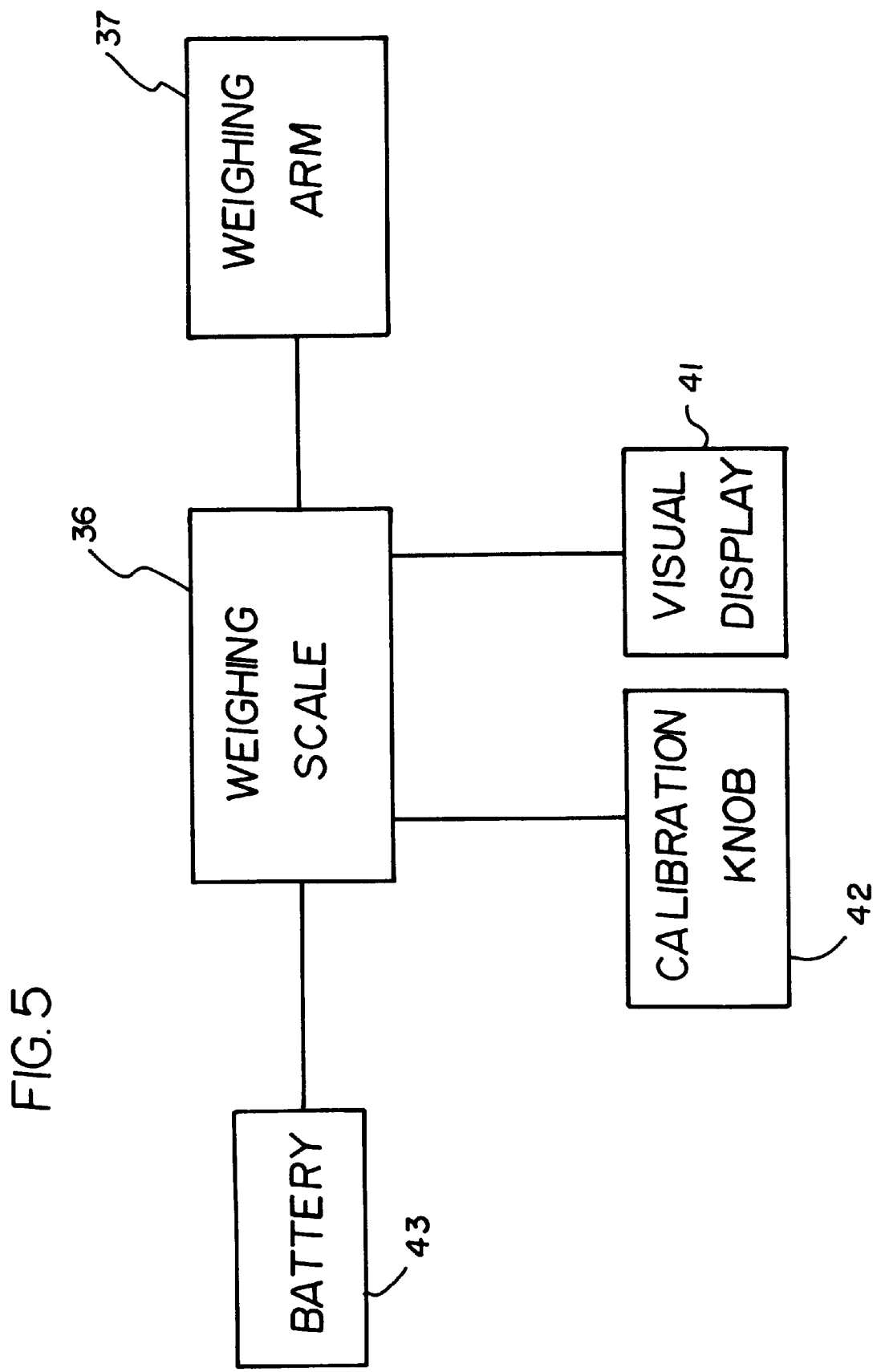
FIG. 5 is a schematic electrical flow chart of the present invention.

With reference now to the drawings, and in particular to FIGS. 1 through 5 thereof, a new fish weighing scale attachment embodying the principles and concepts of the present invention and generally designated by the reference numeral 10 will be described.

As best illustrated in FIGS. 1 through 5, the fish weighing scale attachment 10 generally comprises a housing with a channel in a bottom face of the housing. A mounting block is slidably inserted into the channel of the housing. The mounting block has a pair of outwardly extending flexible straps which are coupled to one another. A conventioned weighing scale is provided in the housing. The weighing scale has a pivoting weighing arm, mounted in a manner conventional in the weighing art, having a spaced apart pair of upwardly extending fingers. The weighing scale also has a conventional visual display provided on the top face of the housing.

The fish weighing scale attachment 10 is designed for attachment to a fishing rod 11 having a reel 12 and a flexible fishing line 13 outwardly extending from the reel and along the fishing rod. In closer detail, the attachment includes a generally rectangular housing 14 having generally rectangular top and bottom faces 15,16, a pair of end edges 17,18 and a pair of side edges 19,20 extending between the end edges of the housing. In an ideal illustrative embodiment, the housing has a length defined between the end edges of about 1 inch, a width defined between the side edges of about 1 inch, and a thickness defined between the top and bottom faces of about ¼ inch.

Preferably, the top and bottom faces of the housing are substantially planar and lie in substantially parallel planes to one another. Also preferably, the end edges of the housing are extended substantially parallel to one another and the side edges of the housing are extended substantially parallel to one another and substantially perpendicular to the end edges of the housing.

The housing has a generally rectangular peripheral flange 21 outwardly extending around the top face of the housing. The peripheral flange and the top face of the housing lie in a common plane with one another. The peripheral flange has a lower face 22 lying in a plane between the top and bottom faces of the housing.

The bottom face of the housing has a channel 23 therein extending from a first of the ends of the housing towards a second of the ends of the housing. The channel of the housing has a generally rectangular U-shaped configuration comprising a spaced apart pair of substantially parallel side walls and a top wall connecting the side walls together. Each of the side walls of the channel has an elongate groove 24 extending therealong. The grooves of the side walls of the channel are preferably extended substantially parallel to one another.

A mounting block 25 is provided having a pair of opposite ends, a pair of sides and an arcuate lower face 26. The mounting block is slidably inserted into the channel of the housing. The mounting block and the channel of the housing are of complementary cooperating transverse cross section thereby preventing separation of the mounting block from the housing without relative sliding motion therebetween. Preferably, each of the sides of the mounting block has an elongate tongue 27 extending therealong between the ends of the mounting block. Each of the tongues of the mounting block is slidably inserted into an associated groove of the channel of the housing.

Ideally, one of the ends of the mounting block has a threaded extent 28 outwardly extending therefrom. The second end of the housing has a circular bore 45 providing an opening into the channel of the housing. The threaded extent of the mounting block is extended through the bore of the second end of the housing. A threaded finger nut 29 is threaded onto the threaded extent to couple the mounting block to the housing.

The lower face of the mounting block has an outwardly facing concavity. In use, the lower face of the mounting block is rested on a portion of the fishing rod such that the fishing rod extends in a direction extending between the ends of the mounting block. Preferably, the mounting block is positioned on the fishing rod adjacent the reel. Ideally, the lower face of the mounting block has a roughened surface 30 with respect to a relatively smooth surface for frictionally enhancing contact between the lower face of the mounting block and the fishing rod to help prevent sliding of the mounting block along the fishing rod.

Each of the sides of the mounting block has a flexible strap 31,32 outwardly extending therefrom. In use, the flexible straps of the sides of the mounting block are wrapped around the fishing rod and adjustably and detachably coupled to one another to attach the mounting block to the fishing rod. Preferably, each of the flexible straps has a longitudinal slot 33 extending therealong. Each of the flexible straps is extended through a coupling buckle 34 such that a portion of each of the flexible straps in the coupling buckle are positioned adjacent one another. The coupling buckle has a threaded fastener 35 extending through the longitudinal slots of the flexible straps at the adjacent portions of the flexible straps in the coupling buckle to couple the flexible straps together.

A conventional electronic weighing scale 36 for weighing an object such as a fish is provided in the housing. The weighing scale has a conventional pivoting weighing arm 37 operatively connected thereto and outwardly extending from a hole in one of the side edges of the housing. An example of a conventional pivoting weighing arm can be found in U.S. Pat. No. 5,088,223 to Chu. The weighing arm is biased by any spring mechanism known in the art in an upwards direction. The weighing arm has a spaced apart pair of upwardly extending fingers 38,39 adjacent a free outer end of the weighing arm. As best illustrated in FIG. 2, in use, the fishing line is extended between the fingers of the weighing arm. A first of the fingers is positioned closer to the first side of the housing than a second of the fingers. The fingers each have a height defined upwardly from the weighing arm. The height of the first finger is greater than the height of the second finger to prevent the fishing line from slipping out from between the fingers by the inwards pulling of the rest of the fishing line in a direction towards the housing. Preferably, the height of the first finger is at least two times the height of the second finger.

In use, the weighing scale ascertains the weight of an object hanging from between the fingers at the free outer end of the weighing arm (that is, the fish 40 hooked onto the fishing line extending between the fingers) by the downwards pivoting of the weighing arm by the weight of the object.

The weighing scale has a generally rectangular visual display 41 which is known in the art and which is electrically connected thereto and provided on the top face of the housing. The visual display providing a visual display of the weight ascertained by the weighing scale of the object hanging on the weighing arm. In use, the visual display provides a digital visual display and has a light source for illuminating the visual display.

The weighing scale preferably also has a rotatable calibrating knob 42 on the top face of the housing as is well known to practitioners familiar with the art. The calibrating knob is connected to the weighing scale to permit a user to zero the weighing scale so that the weighing scale can take into account the tare weight of the fishing line, the hook and any lures and sinkers on the fishing line when weighing a fish hooked on to the fishing line. Since zeroing a conventional electronic scale so that it electronically subtracts the tare weight from the total weight measured is well known in the art, no further description is deemed necessary.

A battery 43 is provided in the housing and is electrically connected to weighing device for providing power to the weighing device. Preferably, the lower face of the peripheral flange has an access panel 44 adjacent the battery to provide access to the battery to permit removal and replacement of the battery from in the housing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish weighing scale attachment for attachment to a fishing rod having a reel and a flexible fishing line outwardly extending from said reel and along said fishing rod, said attachment comprising:

a housing having top and bottom faces, a pair of end edges and a pair of side edges extending between said end edges of said housing;

said bottom face of said housing having a channel therein extending from a first of said ends of said housing towards a second of said ends of said housing;

a mounting block having a pair of opposite ends, a pair of sides and an arcuate lower face;

said mounting block being slidably inserted into said channel of said housing;

said mounting block and said channel of said housing being of complementary cooperating transverse cross section thereby preventing separation of said mounting block from said housing without relative sliding motion therebetween;

said mounting block having a pair of outwardly extending flexible straps, said flexible straps being coupled to one another;

a weighing scale being provided in said housing;

said weighing scale having a pivoting weighing arm connected thereto and outwardly extending from said housing;

said weighing arm having a spaced apart pair of upwardly extending fingers; and said weighing scale having a visual display connected thereto and provided on said top face of said housing.

2. The attachment of claim 1, wherein said housing has a peripheral flange outwardly extending around said top face of said housing, said peripheral flange and said top face of said housing lying in a common plane with one another.

3. The attachment of claim 1, wherein said channel of said housing has a generally rectangular U-shaped configuration comprising a spaced apart pair of side walls and a top wall connecting said side walls together, each of said side walls of said channel having an elongate groove extending therealong, wherein said mounting block has a pair of opposite ends, a pair of sides, each of said sides of said mounting block having an elongate tongue extending therealong between said ends of said mounting block, each of said tongues of said mounting block being slidably inserted into an associated groove of said channel of said housing.

4. The attachment of claim 3, wherein one of said ends of said mounting block has a threaded extent outwardly extending therefrom, said housing having a bore therein providing an opening into said channel of said housing, said threaded extent of said mounting block being extended through said bore of said housing, a threaded nut being threaded onto said threaded extent to couple said mounting block to said housing.

5. The attachment of claim 1, wherein mounting block has an arcuate lower face, said lower face of said mounting block having an outwardly facing concavity.

6. The attachment of claim 5, wherein said lower face of said mounting block has a roughened surface for frictionally enhancing contact between said lower face of said mounting block and another surface.

7. The attachment of claim 1, wherein each of said flexible straps has a longitudinal slot extending therealong, each of said flexible straps being extended through a coupling buckle such that a portion of each of said flexible straps in said coupling buckle are positioned adjacent one another, said coupling buckle having a threaded fastener extending through said longitudinal slots of said flexible straps at said adjacent portions of said flexible straps in said coupling buckle to couple said flexible straps together.

8. The attachment of claim 1, wherein said weighing scale has a rotatable calibrating knob on said top face of said housing.

9. A fish weighing scale attachment system, comprising:
  a fishing rod having a reel and a flexible fishing line outwardly extending from said reel and along said fishing rod;
  an attachment comprising:
    a generally rectangular housing having generally rectangular top and bottom faces, a pair of end edges and a pair of side edges extending between said end edges of said housing;
    said top and bottom faces of said housing being substantially planar and lying in substantially parallel planes to one another;
    said end edges of said housing being extended substantially parallel to one another, said side edges of said housing being extended substantially parallel to one another and substantially perpendicular to said end edges of said housing;
    said housing having a generally rectangular peripheral flange outwardly extending around said top face of said housing, said peripheral flange and said top face of said housing lying in a common plane with one another;
    said peripheral flange having a lower face lying in a plane between said top and bottom faces of said housing;
    said bottom face of said housing having a channel therein extending from a first of said ends of said housing towards a second of said ends of said housing;
    said channel of said housing having a generally rectangular U-shaped configuration comprising a spaced apart pair of substantially parallel side walls and a top wall connecting said side walls together;
    each of said side walls of said channel having an elongate groove extending therealong, said grooves of said side walls of said channel being extended substantially parallel to one another;
    a mounting block having a pair of opposite ends, a pair of sides and an arcuate lower face;
    said mounting block being slidably inserted into said channel of said housing;
    said mounting block and said channel of said housing being of complementary cooperating transverse cross section thereby preventing separation of said mounting block from said housing without relative sliding motion therebetween;
    each of said sides of said mounting block having an elongate tongue extending therealong between said ends of said mounting block;
    each of said tongues of said mounting block being slidably inserted into an associated groove of said channel of said housing;
    one of said ends of said mounting block having a threaded extent outwardly extending therefrom;
    said second end of said housing having a bore providing an opening into said channel of said housing, said threaded extent of said mounting block being extended through said bore of said second end of said housing;
    a threaded nut being threaded onto said threaded extent to couple said mounting block to said housing;
    said lower face of said mounting block having an outwardly facing concavity, said lower face of said mounting block being rested on a portion of said fishing rod such that said fishing rod extends in a direction extending between said ends of said mounting block, wherein said mounting block is positioned on said fishing rod adjacent said reel;
    said lower face of said mounting block having a roughened surface for frictionally enhancing contact between said lower face of said mounting block and said fishing rod;
    each of said sides of said mounting block having a flexible strap outwardly extending therefrom, said flexible straps of said sides of said mounting block being wrapped around said fishing rod and adjustably and detachably coupled to one another to attach said mounting block to said fishing rod;
    wherein each of said flexible straps has a longitudinal slot extending therealong;
    each of said flexible straps being extended through a coupling buckle such that a portion of each of said flexible straps in said coupling buckle are positioned adjacent one another;
    said coupling buckle having a threaded fastener extending through said longitudinal slots of said flexible straps at said adjacent portions of said flexible straps in said coupling buckle to couple said flexible straps together;
    a weighing scale being provided in said housing;
    said weighing scale having a pivoting weighing arm connected thereto and outwardly extending from one of said side edges of said housing;
    said weighing arm having a spaced apart pair of upwardly extending fingers adjacent a free outer end of said weighing arm;
    said fishing line being extended between said fingers of said weighing arm;
    a first of said fingers being positioned closer to said first side of said housing than a second of said fingers;
    said fingers each having a height defined upwardly from said weighing arm, said height of said first finger being greater than said height of said second finger, wherein said height of said first finger is at least two times said height of said second finger;
    said weighing scale having a generally rectangular visual display connected thereto and provided on said top face of said housing;

said weighing scale having a rotatable calibrating knob on said top face of said housing;

a battery being provided in said housing and connected to weighing device; and said lower face of said peripheral flange having an access panel adjacent said battery.

10. A fish weighing scale attachment system, comprising:

a fishing rod having a reel and a flexible fishing line outwardly extending from said reel and along said fishing rod;

an attachment comprising:

a generally rectangular housing having generally rectangular top and bottom faces, a pair of end edges and a pair of side edges extending between said end edges of said housing;

said top and bottom faces of said housing being substantially planar and lying in substantially parallel planes to one another;

said end edges of said housing being extended substantially parallel to one another, said side edges of said housing being extended substantially parallel to one another and substantially perpendicular to said end edges of said housing;

said housing having a generally rectangular peripheral flange outwardly extending around said top face of said housing, said peripheral flange and said top face of said housing lying in a common plane with one another;

said peripheral flange having a lower face lying in a plane between said top and bottom faces of said housing;

said bottom face of said housing having a channel therein extending from a first of said ends of said housing towards a second of said ends of said housing;

said channel of said housing having a generally rectangular U-shaped configuration comprising a spaced apart pair of substantially parallel side walls and a top wall connecting said side walls together;

each of said side walls of said channel having an elongate groove extending therealong, said grooves of said side walls of said channel being extended substantially parallel to one another;

a mounting block having a pair of opposite ends, a pair of sides and an arcuate lower face;

said mounting block being slidably inserted into said channel of said housing;

said mounting block and said channel of said housing being of complementary cooperating transverse cross section thereby preventing separation of said mounting block from said housing without relative sliding motion therebetween;

each of said sides of said mounting block having an elongate tongue extending therealong between said ends of said mounting block;

each of said tongues of said mounting block being slidably inserted into an associated groove of said channel of said housing;

one of said ends of said mounting block having a threaded extent outwardly extending therefrom;

said second end of said housing having a bore providing an opening into said channel of said housing, said threaded extent of said mounting block being extended through said bore of said second end of said housing;

a threaded nut being threaded onto said threaded extent to couple said mounting block to said housing;

said lower face of said mounting block having an outwardly facing concavity, said lower face of said mounting block being rested on a portion of said fishing rod such that said fishing rod extends in a direction extending between said ends of said mounting block, wherein said mounting block is positioned on said fishing rod adjacent said reel;

said lower face of said mounting block having a roughened surface for frictionally enhancing contact between said lower face of said mounting block and said fishing rod;

each of said sides of said mounting block having a flexible strap outwardly extending therefrom, said flexible straps of said sides of said mounting block being wrapped around said fishing rod and adjustably and detachably coupled to one another to attach said mounting block to said fishing rod;

wherein each of said flexible straps has a longitudinal slot extending therealong;

each of said flexible straps being extended through a coupling buckle such that a portion of each of said flexible straps in said coupling buckle are positioned adjacent one another;

said coupling buckle having a threaded fastener extending through said longitudinal slots of said flexible straps at said adjacent portions of said flexible straps in said coupling buckle to couple said flexible straps together;

a weighing arm being outwardly extending from one of said side edges of said housing;

said weighing arm having a spaced apart pair of upwardly extending fingers adjacent a free outer end of said weighing arm;

said fishing line being extended between said fingers of said weighing arm;

a first of said fingers being positioned closer to said first side of said housing than a second of said fingers;

said fingers each having a height defined upwardly from said weighing arm, said height of said first finger being greater than said height of said second finger, wherein said height of said first finger is at least two times said height of said second finger;

a generally rectangular visual display being provided on said top face of said housing;

a calibrating knob being provided on said top face of said housing;

a battery being provided in said housing; and said lower face of said peripheral flange having an access panel adjacent said battery.

* * * * *